No. 726,031. PATENTED APR. 21, 1903.
J. F. CUNNINGHAM.
LOCK FAUCET.
APPLICATION FILED MAY 5, 1902.
NO MODEL.
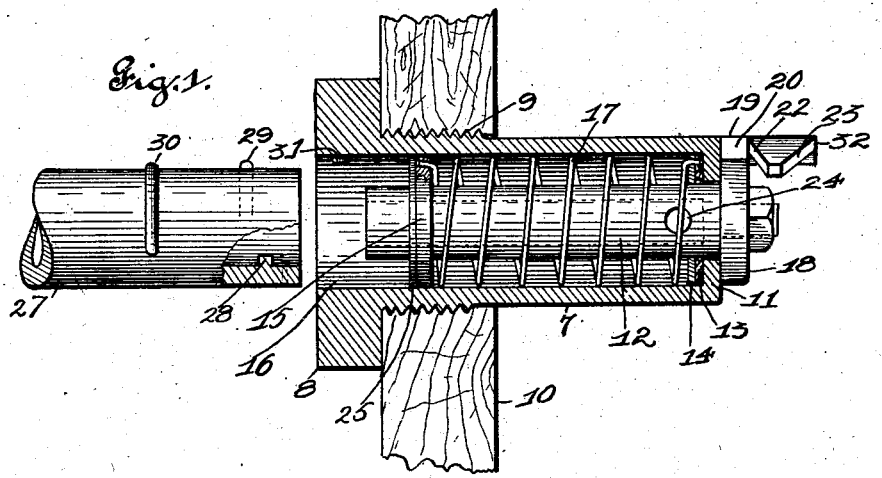
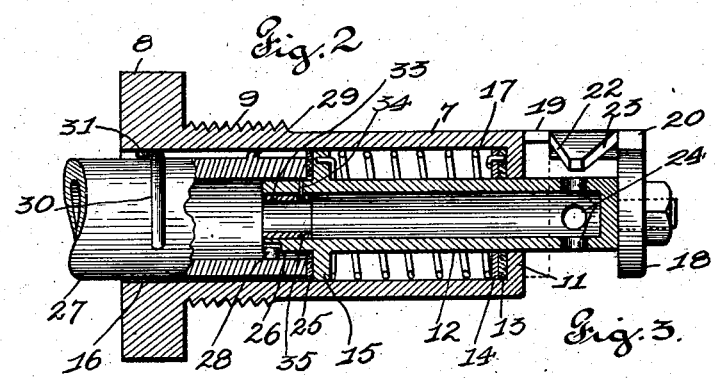
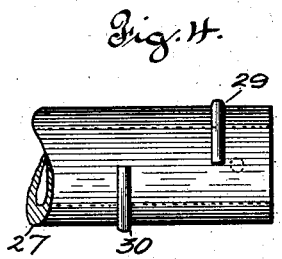
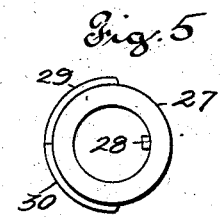
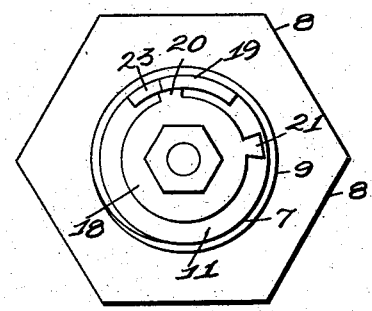
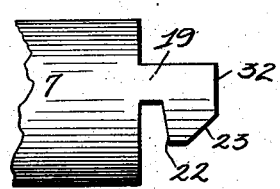
Witnesses
Alfred O. Eicks
M. G. Irwin
Inventor
John F. Cunningham
by Higdon & Longan Attys

UNITED STATES PATENT OFFICE.

JOHN F. CUNNINGHAM, OF SPRINGFIELD, MISSOURI, ASSIGNOR OF ONE-HALF TO JAMES A. DONNELL, OF SPRINGFIELD, MISSOURI.

LOCK-FAUCET.

SPECIFICATION forming part of Letters Patent No. 726,031, dated April 21, 1903.

Application filed May 5, 1902. Serial No. 105,984. (No model.)

*To all whom it may concern:*

Be it known that I, JOHN F. CUNNINGHAM, of the city of Springfield, Green county, State of Missouri, have invented certain new and useful Improvements in Lock-Faucets, of which the following is a full, clear, and exact description, reference being had to the accompanying drawings, forming a part hereof.

My object is to construct an improved lock-faucet; and my invention when narrowly and specifically stated consists of a suitable casing; a nut upon the outer end of the casing; exterior screw-threads upon the periphery of the casing just inside of the nut and adapted to screw into the bung-hole of the barrel; a flange extending inwardly from the inner end of the casing and forming a bearing; a tubular valve slidingly mounted in said bearing, the inner end of said valve being closed and there being openings through the wall of said valve near the inner end; a rubber gasket mounted around the valve in the casing against the inner face of said flange; a metal washer against the outer face of said gasket; a flange extending outwardly from near the outer end of said valve and fitting closely in the opening in said casing; a coil-spring connecting said metal washer with said flange; a disk upon the inner end of said valve, the expansive tension of said spring operating to hold said disk yieldingly against the inner face of the first-mentioned flange; an arm projecting inwardly from the casing, each side of said arm forming a stop; lugs extending from the periphery of said disk, one on each side of said stop; an outer inclined face extending laterally from the inner end of said stop-arm to be engaged by one of said lugs to press said disk against the casing and hold the faucet closed; an inner inclined face extending laterally from said stop-arm to be engaged by said lug and hold the valve open; a faucet adapted to be inserted into the outer end of said casing; a pin extending inwardly from said faucet and adapted to engage in a locking-notch in the outer end of said valve, so as to rotate the valve when the faucet is rotated; a gasket against the outer face of the valve-flange in position to be engaged by the inner end of the faucet; a cam-pin extending into the opening at the outer end of the casing; a cam upon the periphery of said faucet in position to engage said cam-pin, so that the faucet cannot be withdrawn from the casing except when the valve is in its closed position; a second cam upon the periphery of said faucet in position to engage said cam-pin to hold the faucet in position in the casing while the valve is open, and a thimble loosely mounted in the outer end of said valve, so that when an attempt is made to open the valve without the use of the faucet the thimble will turn without opening the valve.

Figure 1 is a longitudinal sectional detail of the casing and the inner end of the faucet, the faucet being removed from the casing. Fig. 2 is a view analogous to Fig. 1 with the faucet inserted in the casing. Fig. 3 is a view in elevation of the inner end of the casing. Fig. 4 is a view in elevation of the inner end of the faucet, the outer end of the faucet being broken away. Fig. 5 is an end elevation of the inner end of the faucet. Fig. 6 is a top plan view of the inner end of the casing as shown in Figs. 1 and 2, drawn to show a stop-arm and inclined face locking the valve closed and locking the valve open.

Referring to the drawings in detail, the casing 7 has a nut 8 upon its outer end and screw-threads 9 upon its periphery immediately inside of the nut, said screw-threads being adapted to screw into the bung-hole of the barrel 10 and said casing being adapted to extend inwardly from the wall of the barrel. A flange 11 extends toward the center from the inner end of the casing 7 and forms a bearing, in which the valve 12 is slidingly mounted. A soft-rubber gasket 13 is placed against the outer face of the flange 11 around the valve 12, and a metal washer 14 is placed against the outer face of the gasket. A peripheral flange 15 is formed near the outer end of the valve 12 and fits closely within the opening 16 of the casing, and a coil-spring 17 connects the flange 15 with the washer 14. A disk 18 is fixed upon the inner end of the valve 12, and the expansive tension of the coil-spring 17 is exerted to hold the disk 18 yieldingly against the inner face of the flange 11. A stop-arm 19 extends inwardly from the inner end of the casing, each side of said arm serving as a stop, and the stop-lugs 20 and 21 extend peripherally from the disk 18, one upon each side of said stop-arm. An inclined surface 22 extends laterally from the inner end of the stop-arm 19 to be engaged by the stop-lug 20 to force the disk 18 against the flange 11 and hold the faucet closed. An inclined surface 23 extends laterally from the stop-arm 19 to be engaged by the stop-lug 20 and hold the faucet open, as shown in Fig. 2. Openings 24 are formed through the wall of the valve 12 a short distance from the disk 18, so that when the faucet is opened, as shown in Fig. 2, liquid may pass inwardly from the barrel through said openings 24 and outwardly through the faucet, and when the faucet is closed, as shown in Fig. 1, no liquid can pass through said openings 24.

A soft-rubber gasket 25 is placed against the outer face of the peripheral flange 15, and a locking notch or recess 26 is formed in the periphery and extreme outer end of the valve 12.

A faucet 27 is adapted to have its inner end inserted into the opening 16 of the casing and has a locking-lug 28 to engage in the notch 26, as required to rotate the valve when the faucet is rotated. A cam 29 extends outwardly from near the inner end of the faucet, and a similar cam 30 is formed upon the periphery of the faucet some distance outside of the cam 29. A cam-pin 31 extends into the outer end of the opening 16 to engage the lugs 29 and 30.

The parts are so assembled that when the faucet 27 is inserted into the opening 16 the cam 29 will strike the pin 31, and then the faucet is rotated until the pin 31 or right-hand end of the cam 29 is as shown in Fig. 4. Then by pushing the faucet inwardly the pin 28 will enter the notch 26. Then the faucet is rotated in the opposite direction until the stop-lug 21 strikes the stop-arm 19. Then the faucet is pushed farther into the casing, then pushing the valve through the bearing in the flange 11 and carrying the stop-lug 20 past the ends of the inclined surfaces 22 and 23 and carrying the cam 30 past the pin 31. Then the faucet is again rotated in the reverse direction. The cam engages the pin 31 and passes inside of said pin. The stop-lug 20 passes along the inclined surface 23 to the end 32 of the stop-arm 19. Then the regular valve of the faucet may be turned and the desired amount of liquid drawn. Then the faucet is removed from the casing, leaving the valve closed in the position shown in Fig. 1. The thimble 33 is loosely mounted in the outer end of the valve 12 and held in position by means of the pin 34 operating in the groove 35, so that when the faucet is out of the casing and an attempt is made to open the valve the thimble 33 will rotate in the valve and the valve will not be opened.

Torsional tension of the spring 17 is exerted to hold the valve in its position and resist any attempts at opening the valve without the use of the faucet.

I claim—

1. An improved lock-faucet, comprising a casing having a nut on its outer end and provided with external screw-threads, a tubular valve mounted to slide in said casing, a flange extending outwardly from said valve, a coil-spring bearing upon said flange and upon the end of said casing to normally retain said valve in a closed position, an arm projecting inwardly from the inner end of said casing so that each side thereof forms a stop to limit the rotation of said valve, stop-lugs carried by the inner end of said valve one on each side of said stop, and a faucet adapted to be inserted in the outer end of said casing to rotate the said valve in order to lock or unlock the same, substantially as specified.

2. An improved lock-faucet, comprising a casing having a nut on its outer end and provided with external screw-threads, a tubular valve mounted to slide in said casing, a flange extending outwardly from said valve, a coil-spring bearing upon said flange and upon the end of said casing to normally retain said valve in a closed position, an arm projecting inwardly from the inner end of said casing so that each side thereof forms a stop to limit the rotation of said valve, stop-lugs carried by the inner end of said valve one on each side of said stop, said arm having an outer inclined face extending laterally from the inner end of said arm to be engaged by one of said lugs to hold the valve closed, and a faucet adapted to be inserted in the outer end of said casing to rotate the said valve in order to lock or unlock the same, substantially as specified.

3. An improved lock-faucet, comprising a casing having a nut on its outer end and provided with external screw-threads, a tubular valve mounted to slide in said casing, a flange extending outwardly from said valve, a coil-spring bearing upon said flange and upon the end of said casing to normally retain said valve in a closed position, an arm projecting inwardly from the inner end of said casing so that each side thereof forms a stop to limit the rotation of said valve, stop-lugs carried by the inner end of said valve one on each side of said stop, said arm having an outer inclined face extending laterally from its inner end to be engaged by one of said lugs to hold said valve closed, also having an inner inclined face extending laterally to be engaged by one of said lugs to hold the valve open, and a faucet adapted to be inserted in the outer end of said casing to rotate the said valve in order to lock or unlock the same, substantially as specified.

4. An improved lock-faucet, comprising a casing having a nut on its outer end provided with external screw-threads, a tubular valve mounted to slide in said casing, a flange extending outwardly from said valve, a coil-spring bearing upon said flange and upon the end of said casing to normally retain said valve in a closed position, an arm projecting inwardly from the inner end of said casing so that each side thereof forms a stop to limit the rotation of said valve, stop-lugs carried by the inner end of said valve one on each side of said stop, said valve having a locking-notch in its outer end, a faucet adapted to be inserted in the outer end of said casing, and provided with a pin to engage in said locking-notch to rotate said valve, substantially as specified.

5. An improved lock-faucet, comprising a casing having a nut on its outer end and provided with external screw-threads, a tubular valve mounted to slide in said casing, a flange extending outwardly from said valve, a coil-spring bearing upon said flange and upon the end of said casing to normally retain said valve in a closed position, an arm projecting inwardly from the inner end of said casing so that each side thereof forms a stop to limit the rotation of said valve, stop-lugs carried by the inner end of said valve one on each side of said stop, said valve having a locking-notch in its outer end, a faucet adapted to be inserted in the outer end of said casing provided with a pin to engage in said locking-notch to rotate said valve, a gasket placed against the outer face of the valve-flange in position to be engaged by the inner end of said faucet, and cam connection between said faucet and said casing arranged so that said faucet cannot be withdrawn from said casing except when the valve is in its closed position, substantially as specified.

6. An improved lock-faucet, comprising a casing, a tubular valve mounted to slide in said casing and provided with a flange, a coil-spring bearing upon said flange and upon said casing to normally retain said valve in a closed position, a faucet adapted to be inserted in the outer end of said casing to rotate said valve, and a thimble loosely mounted upon the outer end of said valve so that when an attempt is made to open the valve without the use of the faucet, said thimble will turn when opening the valve, substantially as specified.

In testimony whereof I affix my signature in presence of two witnesses.

JOHN F. CUNNINGHAM.

Witnesses:
 ARCH A. JOHNSON,
 GEO. A. MCCALLUM.